United States Patent [19]
Wilkins

[11] Patent Number: 5,826,541
[45] Date of Patent: Oct. 27, 1998

[54] GELATIN-PLASTIC FOAM WIRE CAGE BIRD FEEDER AND PROCESS

[76] Inventor: Judd R. Wilkins, 281 Littletown Quarter, Williamsburg, Va. 23185

[21] Appl. No.: 984,912

[22] Filed: Dec. 4, 1997

[51] Int. Cl.[6] .................................................... A01K 39/01
[52] U.S. Cl. ............................................................ 119/57.8
[58] Field of Search .................................. 119/52.2, 52.1, 119/52.3, 52.4, 57.8, 57.9

[56] References Cited

U.S. PATENT DOCUMENTS

| | | | |
|---|---|---|---|
| 3,186,379 | 6/1965 | Grella | 119/57.9 |
| 3,301,217 | 1/1967 | Prowinsky | 119/57.9 |
| 3,399,650 | 9/1968 | Goodman | 119/57.9 |
| 4,434,745 | 3/1984 | Perkins et al. | 119/57.9 |
| 5,111,772 | 5/1992 | Lipton | 119/57.9 |
| 5,699,752 | 12/1997 | Wilkins | 119/57.8 |

*Primary Examiner*—Thomas Price
*Attorney, Agent, or Firm*—Wallace J. Nelson

[57] ABSTRACT

A hanging wire cage bird feeder is provided with a plastic foam base supporting a gel structure saturated with bird seed that completely fills the wire cage. A pair of perch supports are provided at the base of the wire cage structure to support birds attempting to feed from the feeder. The process for making the feeder includes providing a wire cage with a plastic foam bottom surface, positioning the wire cage onto an absorbent surface, covering the exterior of the wire cage with a fluid proof sleeve and filling the wire cage with a hot slurry of a water/gel mixture saturated with bird seed. The filled wire cage is them placed in a freezer compartment of a refrigerator to solidify the gel. After solidification, the wire cage is removed from the freezer, the sleeve removed, and excess gel trimmed from the base of the wire cage. After conditioning for twenty-fours at room temperature, the wire cage feeder is ready for hanging outdoors.

12 Claims, 3 Drawing Sheets

5,826,541

GELATIN-PLASTIC FOAM WIRE CAGE BIRD FEEDER AND PROCESS

FIELD OF THE INVENTION

This invention relates to bird feeders, in general, and relates specifically to a wire cage bird feeder containing a gelatin saturated with bird seed and having perch supports thereon, and the process of making same.

BACKGROUND OF THE INVENTION

This invention is an improvement of applicant's invention described in copending application Ser. No. 08/755,485 filed Nov. 22, 1996 for "GELATIN-PLASTIC FOAM BIRD FEEDING STATION AND PROCESS". This prior application is incorporated herein by reference. In the prior application, bird feeders are made by saturating plastic foam cores with gelatin and coating the saturated core with bird seed. When displayed in wire cages, birds readily consumed the seeds in a day or less. In an attempt to increase the number of seeds, thinner cores of plastic foam were employed but the seeds were still consumed in a day or two.

In the present invention, the gel, preferably agar, and plastic foam are employed in a different structural relationship, and process, to produce a feeder that supplies seeds to birds for an extended period of time, usually five to seven days.

Accordingly, it is an object of the present invention to provide an improved bird feeder that has a relatively long period of time use capability.

Another object of the present invention is a novel process for constructing an improved bird feeder;.

A further object of the present invention is a novel hanging bird feeder having a built-in perch capable of supporting feeding birds.

An additional object of the present invention is a bird feeder and process of making same that utilizes advantageous features of prior art bird feeders while increasing the useful life thereof.

SUMMARY OF THE INVENTION

According to the present invention, the foregoing and additional objects are attained by providing a wire cage bird feeder adapted to be suspended from an overhead support alone, or with other wire cage feeders, and containing a saturated quantity of bird seed disposed in a gel structure. The wire cage feeder includes a top, a bottom, and four connected side portions and is formed of open mesh wire. A layer of porous foam plastic is disposed on the bottom of the wire cage structure. The top portion of the wire cage is hinged to one of the cage side portions to permit selective opening and closing of the wire cage. A suitable connection hook is also secured to the top portion to permit attachment to an overhead structure, as in applicant's copending application.

For fabrication, the open wire mesh wire cage is positioned onto an absorbent material, such as one or more paper towels placed on a plate or other movable surface. An open end covering is placed about the four sides of the wire mesh cage and a thick mixture of bird seed and melted gelatin is spooned into the open top to completely fill the wire cage structure. The top portion is closed and the filled wire cage and absorbent base and movable surface is then placed into a cooling container, such as a freezer, to permit the melted gelatin to solidify into the gel state.

After the gel solidifies, the wire cage is removed from the cooling container and the open end covering therefor is lifted off. The absorbent base surface is then removed and the excess gel extending from the bottom of the wire cage trimmed away, leaving the completed wire cage bird feeder ready for attachment to a suitable overhead structure.

BRIEF DESCRIPTION OF THE DRAWINGS

A more complete appreciation of the invention and many of the attendant advantages thereof will be more readily apparent as the same becomes better understood in reference to the accompanying drawings wherein.

DETAILED DESCRIPTION

Figure 1:
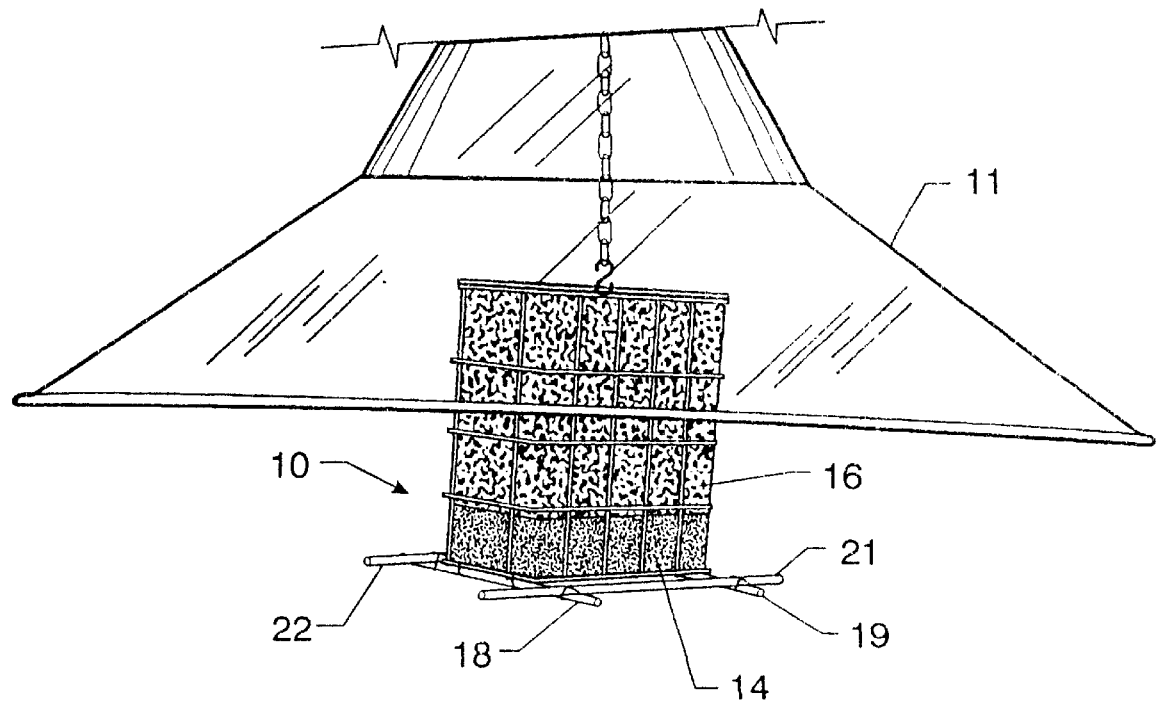
FIG. 1 is a schematic view of the bird feeder according to the present invention and shown suspended from an overhead fixed structure.
Figure 2:
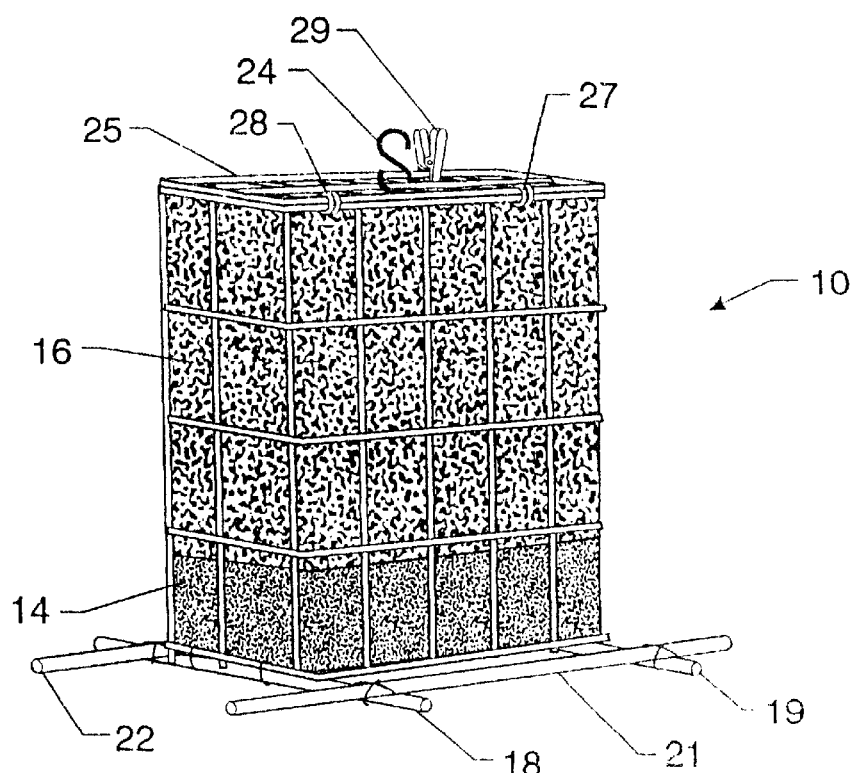
FIG. 2 is a schematic, more detailed, view of the bird feeder shown in FIG. 1 prior to being placed outdoors.

Referring now to the drawings, and more particularly to FIGS. 1 and 2, the wire cage bird feeder of the present invention is shown, and designated generally by reference numeral 10. Bird feeder 10 is suspended beneath a clear plastic canopy 11 attached to an overhead support, not illustrated. Bird feeder 10 is rectangular configured and is formed of open mesh wire including a top portion, a bottom portion and four side portions. A plastic foam disk 14 is disposed within, and on the bottom portion of, wire cage feeder 10. The remainder of wire cage feeder 10 is filled with a gel 16, saturated with a mixture of bird seed, as will be further explained hereinafter.

A perch assembly is secured to the base of wire cage 10 and includes a first pair of spaced bamboo skewers 18,19 attached to and extending across the bottom of wire cage 10. A second pair of spaced bamboo skewers 21,22 (FIG. 5) are perpendicular to, and secured to the first pair of bamboo skewers 18,19 adjacent the ends thereof, as will be further explained hereinafter in reference to FIG. 5.

As more clearly shown in FIG. 2, an "S" hook 24 is secured to the top portion 25 of bird feeder cage 10 to facilitate attachment of the feeder to an overhead structure. Also, top portion 25 is provided with a hinge connection via hinges 27,28 to permit opening and closing of top portion 25. A suitable closure, such as alligator clip 29, is employed to maintain top portion 25 closed when wire cage feeder 10 is filled with the gelled bird seed mixture 16.

Wire cages employed to construct feeder 10 in the present invention are available from various hardware, bird/feed, and department stores as "Hanging Suet Baskets". Although available in different sizes, the cage size employed in the specific embodiment described herein was 5 inches tall, 4 and ⅝ inches wide, and 1 and ½ inches deep, with ⅞ by ⅞ inch grid openings.

Figure 3:
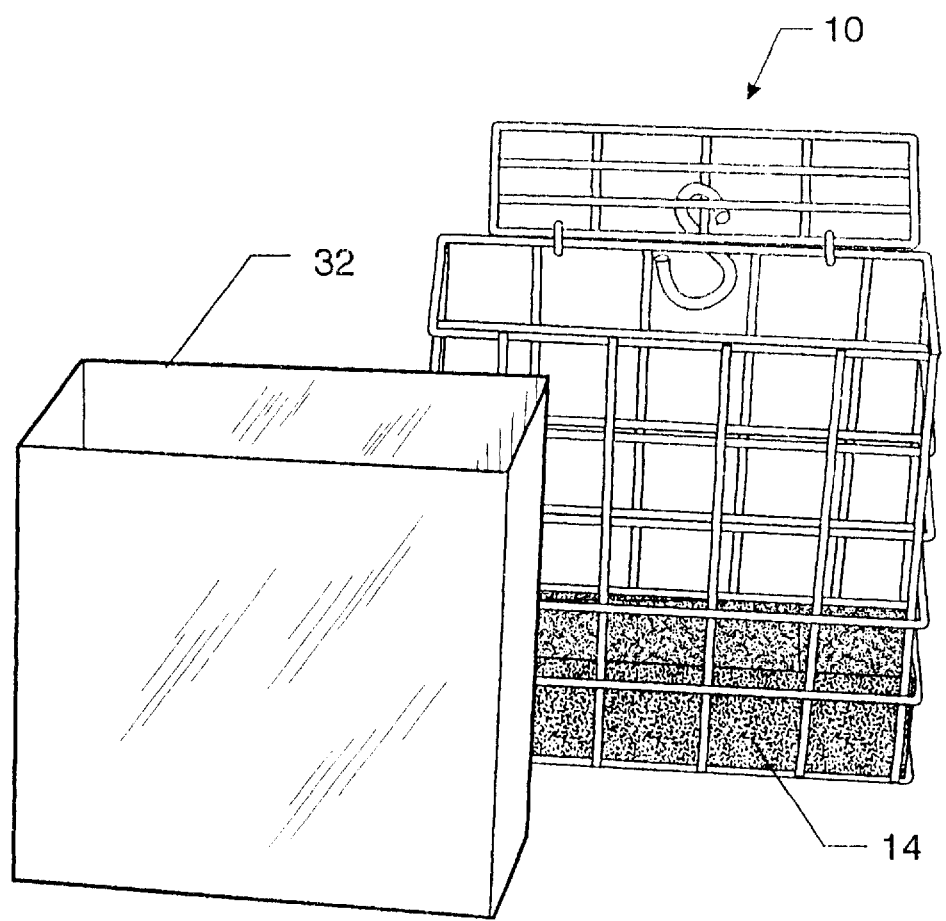
FIG. 3 is a schematic view of an empty wire cage feeder and the cover therefor employed in the process of making the bird feeder shown in FIG. 1.

Referring now to FIG. 3, a metal cover 32 for wire cage feeder 10 is illustrated. Metal cover 32 is open at each end and has interior dimensions slightly larger than the exterior dimensions of wire cage 10.

Figure 4:
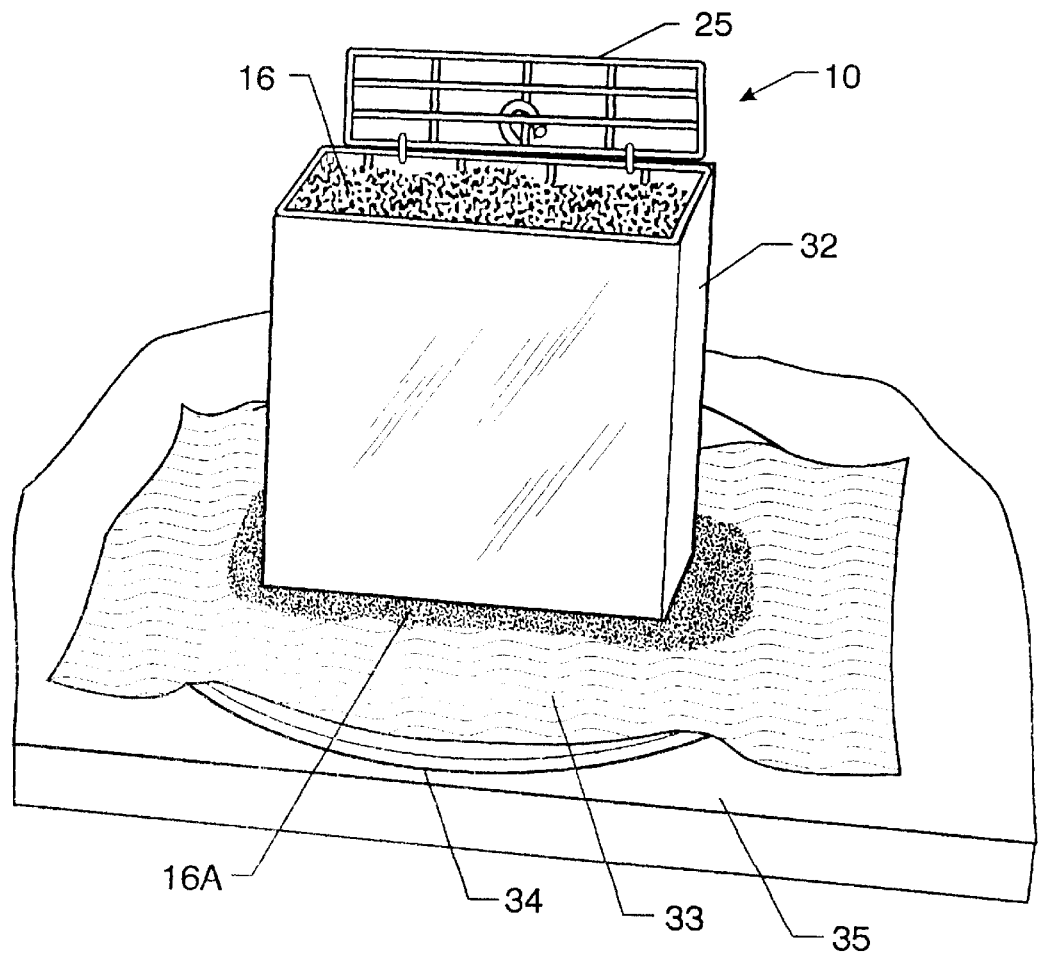
FIG. 4 is a schematic view of the wire cage bird feeder and encased cover shown in FIG. 3 during the process of making the bird feeder shown in FIG. 1.

As shown more particularly in FIG. 4, metal cover 32 is slidably positioned over wire cage 10, after the cage has been placed onto an absorbent material base 33 positioned on a plate 34 that is disposed on a support surface 35. The top portion 25 of wire cage 10 is opened and a disk of foam plastic 14 (FIG. 3) positioned on the bottom surface of wire cage 10. A saturated mixture, or thick slurry, of bird seed in a hot liquid gel 16 is then slowly and inclemently spooned into the covered wire cage 10. The gel/bird seed slurry is tapped or tamped with the spoon, as wire cage 10 is filled, to ensure a complete filling of all empty space therein. After filling, the encased wire cage 10 is immediately placed in a cool environment to solidify the gel, as described further hereinafter. After gel solidification, the covered wire cage 10 is removed from the cold environment, cover 32 removed therefrom and excess gel 16a, that has seeped through plastic foam disk 14, is trimmed from the wire cage 10. After storing at room temperature for twenty-four hours, the wire cage bird feeder 10 containing the gelled bird seed mixture is ready for hanging outdoors, as illustrated in FIG. 1.

Figure 5:
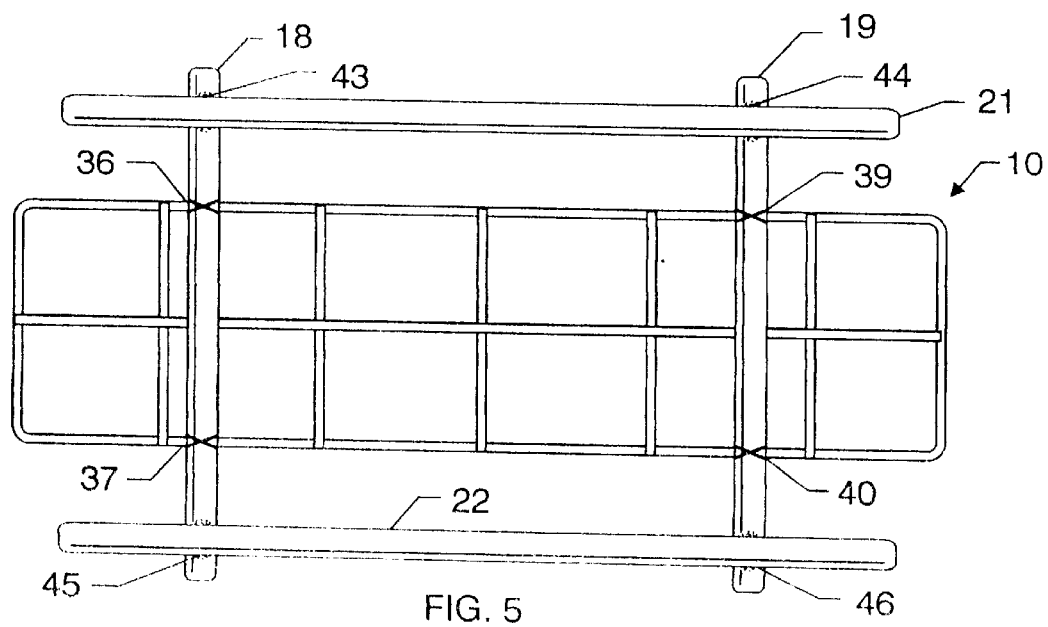
FIG. 5 is a bottom view of an empty wire cage bird feeder of the present invention illustrating the perch attachments thereon.

Referring now more particularly to FIG. 5, the perch for feeding birds is more clearly shown in this bottom view of wire cage feeder 10. As shown therein, first pair of spaced parallel supports 18,19 are shown extending across the bottom of wire cage feeder 10. As described hereinbefore, in the preferred embodiment of the present invention, the first pair of spaced parallel supports 18,19 are formed of suitable lengths of bamboo skewers. Bamboo skewer support 18 is secured to respective opposite sides of the bottom portion of wire cage feeder by wire wrappings 36, 37. Bamboo skewer support 19, spaced parallel from support 18, is secured to respective opposite sides of the bottom portion of wire cage feeder 10 by wire wrappings 39,40.

A second pair of spaced support members 21,22 are provided in parallel relationship to each other and perpendicular to the first pair of supports 18,19. Second support member 21 is glued, or otherwise conventionally secured (for example, wire wrappings shown but not designated in FIGS. 1 and 2) at points 43,44 adjacent to an end of both first supports 18,19 and second support member 22 is glued, or otherwise conventionally secured at points 45,46 adjacent to the other or opposite ends of both first supports 18,19. Second parallel support members 21,22 serve to provide a convenient perch for birds seeking feed from wire cage feeder 10.

In a specific embodiment, the open end metal cover 32 was constructed of 0.040 gauge aluminum and had the physical dimensions of: 5 inches height, 4 and $^{15}/_{16}$ inches wide, and 1 and $^{7}/_{8}$ inches deep. The metal cover serves to confine the seed slurry within the boundaries of the wire cage 10 while also acting as a heat sink during solidification of the gel in the cool environment.

The plastic foam disk 14 is constructed from polystyrene plastic foam and is available from Piece Goods Stores in various width and thicknesses. In the specific embodiment described herein, a rectangle plastic foam disk was employed having a one inch thickness and sides of four and one-half inches by one and one-half inches. This plastic foam 14 was positioned in the bottom of wire cage feeder 10 to contain the seed slurry 16 within the cage and to allow penetration of the foam by the liquid seed slurry and, during solidification, to bind the seeds to the foam.

The gel employed in the specific embodiment of the present invention was agar manufactured by Difco Bacto-Agar, Detroit, Mich. and obtained from Leigh Essex Scientific Co., Longwood, Fla. This agar gel provided for excellent "seed to seed" binding required for the large quantity of seeds in the slurry of the present invention. Conventional food coloring may be employed in the agar to provide selected color for the feeder ingredients to attract specific species of birds. Bird seed are widely available from bird/feed, hardware, and department stores.

The process of the present invention permits layering of various seed types, i.e., safflower with sunflower or sunflower with general mixed seeds. It was noted that when sunflower seeds without hulls were layered with conventional seeds, only the hulled seeds were consumed.

A specific bird seed/gel slurry was prepared in one specific embodiment of the present invention by adding one and one/half tablespoons of agar to one and two/thirds cups of water in a four cup measuring cup. Two cups of bird seed were added, with stirring, to provide a thick slurry and the cup placed in a microwave oven at high setting for eight to nine minutes or until the mixture boils. Larger quantities of the bird seed/gel slurry may are prepared by using this same ratio of ingredients. Food coloring, if desired, is added to the hot slurry at this time.

The metal cover 32 was placed onto wire cage 10 positioned on a paper towel 33 covered dinner plate 34 and placed in the freezing compartment of a refrigerator for five-seven minutes for conditioning. After removal of the conditioned wire cage and cover from the freezer, the stirred seed slurry is spooned into the metal covered wire cage, with tapping by the spoon, to assure uniform filling of the wire cage with the seed slurry. After filling the metal covered wire cage, the plate and its contents are again placed in the freezer compartment of a refrigerator for approximately fifteen minutes to effect gelling of the seed slurry. The plate containing the gelled/bird seed mixture wire cage is removed from the freezer and metal cover 32 removed therefrom. Excess gel, along with any remanents of the absorbent paper towel, is then trimmed from the base of the wire cage. The recovered gel/bird seed filled wire cage feeder 10 is stored at room temperature for at least 24 hour before placing it outdoors.

The process described herein is adapted for use in the kitchen environment and commercial applications could involve some minor obvious modifications therein. Once all of the materials are on hand, it only requires only about 30–40 minutes to make one of the feeders 10.

Although the invention has been described relative to specific embodiments thereof, it is not so limited and there are numerous variations and modifications thereof that will be readily apparent to those skilled in the art in light of the above teachings. For example, the parallel supports for the perch in the preferred embodiment was bamboo skewers but any suitable light weight material suitable for supporting the weight of birds may be employed for these supports. Also, the attachment of the perch supports is not limited to the wire wrappings and glue procedure described herein. Any conventional attachment clips, or other attachments, may be employed for these structures without departing from the scope of the invention.

It is therefore to be understood that, within the scope of the appended claims, the invention may be practiced other than as specifically described herein.

What is claimed as new and desired to be secured by Letters Patent of the United States is:

1. A bird feeder comprising:

a wire cage forming an open mesh enclosure;

said open mesh enclosure including a top, a bottom, and four side wall portions;

means permitting opening and closing of said open mesh enclosure;

a porous foam plastic disk positioned within said wire cage and disposed on and covering the bottom portion thereof;

a solidified gel structure disposed on said porous foam plastic disk and substantially filling said open mesh enclosure;

said solidified gel structure containing a quantity of bird seed completely embedded therein;

means on said wire cage forming an exterior perch for supporting birds in a position to feed on the bird seed embedded in said solidified gel structure; and means on said wire cage to facilitate suspension thereof from an overhead structure.

2. The bird feeder of claim 1 wherein the entire thickness of said solidified gel structure filling said open mesh enclosure is completely saturated with bird seed.

3. The bird feeder of claim 1 wherein the solidified gel structure containing a quantity of bird seed completely embedded therein consists of a mixture of bird seed, water and a gelatin having a mixture ratio of one and one-half tablespoons of agar, one and two-thirds cups of water and two cups of bird seed.

4. The bird feeder of claim 1 wherein said means on said wire cage forming an exterior perch for supporting birds in a position to feed on the bird seed embedded in said gel structure includes:

a first pair of spaced parallel supports attached to and extending across the bottom portion of said wire cage;

said first pair of spaced parallel supports having end portions extending beyond the sidewalls of said wire cage; and a second pair of spaced parallel supports disposed in perpendicular relationship to, and individually secured to the end portions of, said first pair of spaced parallel supports.

5. A method of making a hanging bird feeder comprising the steps of:

providing an open mesh wire cage having a top, a bottom, and four side portions, with the top portion being hingedly connected to one of the side portions and rotatable about the hinged connection to facilitate opening and closing of the open mesh wire cage;

opening the top portion of the wire cage and covering the interior bottom thereof with a thin porous plastic foam disk;

positioning the closed wire cage onto an absorbent support surface;

providing a solid covering over the exterior of the wire cage with the covering having open ends and liquid proof side portions;

preparing a thick hot slurry of bird seed, water and gelatin;

spooning the thick hot slurry of bird seed, water and gelatin into the covered wire mesh cage to completely fill the wire cage;

closing the top portion of the wire cage and placing the filled wire mesh cage in a cold environment to solidify the mixture of bird seed, water and gelatin into a gel mass;

removing the filled wire mesh cage from the cold environment and removing the solid covering from the wire mesh cage to recover a wire mesh cage filled with a saturated bird seed gel.

6. The method of claim 5 including the steps of:

separating the wire mesh cage filled with saturated bird seed gel from the absorbent surface and trimming any excess gel from the bottom of the wire mesh cage.

7. The method of claim 6 including the step of providing an exterior perch for supporting birds in a position to feed on the saturated bird seed gel contained in the wire cage.

8. The method of claim 7 wherein the step of providing an exterior perch includes:

securing a first pair of spaced parallel supports to the bottom of the wire cage of sufficient length to extend beyond the sidewalls of the wire cage and securing a second pair of spaced parallel supports disposed in perpendicular relationship to, and individually secured to the end portions of, the first pair of spaced parallel supports.

9. The method of claim 5 wherein the step of preparing a hot slurry of bird seed, water and gelatin includes mixing an ingredient ratio of: one and one-half tablespoons of agar/one and two-thirds cups of water/two cups of bird seed.

10. The method of claim 9 wherein the ratio mixture of bird seed, water and agar is heated to boiling conditions prior to the step of spooning the slurry into the covered wire mesh cage.

11. The method of claim 5 wherein the step of placing the filled wire cage in a cold environment consists of placing the filled wire cage in a freezer until the bird seed/water/agar slurry solidifies.

12. A bird feeder comprising:

a wire cage forming an open mesh enclosure;

said open mesh enclosure including a top portion, a bottom portion, and four side wall portions;

a solidified gel structure substantially filling said open mesh enclosure;

a quantity of bird seed saturating, and substantially embedded within, said solidified gel structure;

perch means releasably secured to said bottom portion of said open mesh enclosure; and hook means secured to said top portion of said open mesh enclosure to facilitate suspension thereof from an overhead structure.

* * * * *